United States Patent [19]

Pipenhagen, Jr.

[11] 3,969,948

[45] July 20, 1976

[54] AUTOMATIC BICYCLE TRANSMISSION

[76] Inventor: Charles A. Pipenhagen, Jr., 835 Butternut Court, Roselle, Ill. 60172

[22] Filed: Aug. 25, 1975

[21] Appl. No.: 667,556

[52] U.S. Cl. .............................. 74/244; 280/236; 74/230.22; 74/230.23
[51] Int. Cl.² ........................................ B62M 9/06
[58] Field of Search .............. 74/244, 243 R, 217 B, 74/230.22, 230.23; 280/236, 237, 238, 261

[56] References Cited

UNITED STATES PATENTS

| 522,427 | 7/1894 | Leggo | 74/244 |
| 593,285 | 11/1897 | VanEyck | 74/244 X |
| 2,584,447 | 2/1952 | Hayot | 74/244 |
| 2,827,797 | 3/1958 | Bell et al. | 74/244 X |
| 3,798,989 | 3/1974 | Hunt | 74/244 |
| 3,800,613 | 4/1974 | Clark | 74/244 |
| 3,850,045 | 11/1974 | Hagen | 74/244 |
| 3,861,227 | 1/1975 | Hunt | 74/217 B |
| 3,867,851 | 2/1975 | Gregory et al. | 74/244 |

FOREIGN PATENTS OR APPLICATIONS

| 961,243 | 11/1949 | France | 74/244 |

Primary Examiner—Kenneth H. Betts
Attorney, Agent, or Firm—Kenneth T. Snow

[57] ABSTRACT

An automatically variable speed ratio transmission for a pedal driven vehicle such as a bicycle with a chain and sprockets. A pedal operated chain driving sprocket is capable of having its diameter infinitely variable through a predetermined range. The driving sprocket consists of a plurality of small sprockets journally mounted on bell-crank arms having planar offsets for rotation of the small sprockets in one direction only. The bell-crank arms are pivotally mounted on a disc in a uniform circular pattern therearound. The arms and their small sprockets are arranged and constructed to define the vehicle's driving sprocket. The plurality of bell-crank arms are interconnected with each other and are arranged to be uniformly spring biased in one direction. When external resistance to pedalling increases because of uneven terrain, the plurality of small sprockets move radially inwardly to thus reduce the diameter of the driving sprocket making it easier to pedal the vehicle, and conversely when external resistance to pedalling is reduced the plurality of small sprockets move radially outwardly in unison to immediately increase the diameter of the driving sprocket and thus gain speed with substantially the same effort in pedalling.

15 Claims, 7 Drawing Figures

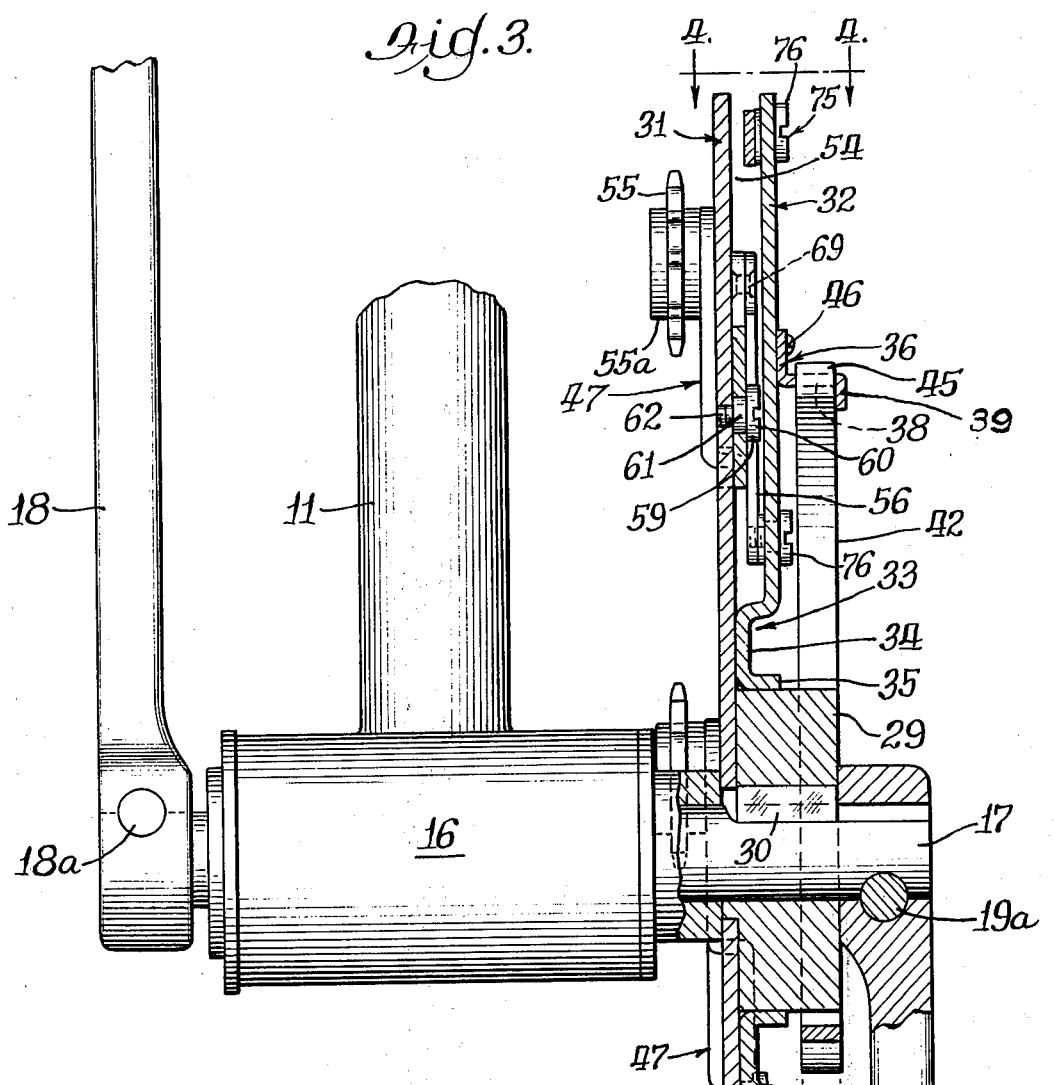

AUTOMATIC BICYCLE TRANSMISSION

BACKGROUND OF THE INVENTION

1. Field of the Invention

Pedal driven bicycles continue to be used as a mode of transportation. And, this is true more today than ever before because of the diminishing supply of petroleum which has been the dominant source of energy for power driven vehicles. Bicycles and other pedal operated vehicles usually are chain driven from a driving sprocket operated by foot pedals to a usually smaller wheel driven sprocket. For many years the driving ratios between the sprockets were fixed. There then followed development of means in the wheel associated sprocket to change the driving ratios to the driven wheel. As a rule this change speed mechanism was contained within the wheel hub and required lever means shifted by the driver to effect changes in wheel driving ratios. In such an arrangement the number of driving ratios was obviously limited because of the small size of the hub.

More recently the market has seen the advent of bicycles in which the different ratios were obtained at the position of the pedal driving sprocket and at the rear driven sprocket. Various means have been employed in this position and including multiple sprockets which require the shifting of the chain from one sprocket to another when ratios are to be changed. More speed ratios are obtainable at this position but the shifting of the chain from sprocket to sprocket is not too stable and the actuating means for the driver is somewhat complex. In all of the cycles on the market with multi-speed transmissions the operator is required to manually shift some lever mechanism to accomplish speed changes.

The present invention is directed to an automatically operable speed change transmission for bicycles or other chain driven vehicles or devices without the operator thereof doing any shifting of levers or the like.

2. Description of the Prior Art

A preliminary patent search was conducted and numerous patents were found which had similar characteristics, but no prior patent disclosed an automatically operable transmission comparable to that of applicant. The diameter of applicant's driving sprocket is effectively and automatically changed by external factors resisting the pedalling of that bicycle. For many years others have attempted to and some actually did change sprocket diameters to gain different bicycle speeds. The following patents among many others were considered before the making of this present application for patent.

| | |
|---|---|
| Leggo, Jr. | 522,427 |
| Leggo, Jr. | 524,830 |
| Van Eyck | 593,285 |
| Hayot | 2,584,447 |
| Bell et al | 2,827,797 |
| Hunt | 3,798,989 |
| Clark | 3,800,613 |
| Hagen | 3,850,045 |
| Bravin | 3,861,232 |
| Hunt | 3,861,227 |
| Gregory et al | 3,867,851 |

Leggo, Jr. U.S. Pat. No. 522,427 is a two speed device which employs a plurality of hinged arms with a single sprocket tooth at each outer end thereof. In one position of the hinged arms the outwardly projecting tooth at each arm's end forms with the other arms a relatively small diametered sprocket whereas when the arms are swung about their hinges so the other ends are projecting outwardly the teeth at those other ends form a relatively large diametered sprocket. It is by this means of swinging arms to either of two limiting positions that two speeds of a bicycle are obtained.

Leggo, Jr. U.S. Pat. No. 524,830 employs radially moving sprocket tooth segments. In this device slotted levers H are arranged to actuate the cam disc E to effect a radial movement of the sprocket teeth. The main feature of this Leggo, Jr. device is to retract the sprocket teeth when its effective diameter is being changed.

Van Eyck U.S. Pat. No. 593,285 employs spring urged sprocket tooth segments which are manually adjusted to different radial positions.

Hayot U.S. Pat. No. 2,584,447 shows a plurality of small sprockets mounted on the outer ends of independent spring arms to supposedly comprise one changing diameter driving sprocket. However, as the spring arms are independent of each other the resultant sprocket will take a peculiar shape. Where the chain exerts a great inward pressure or force on an arm it will swing that one arm inwardly to a great degree. However, the chain does not exert equal forces on the several arms carrying sprockets and hence the sprocket teeth are irregularly positioned — not in any manner forming a circular sprocket. This irregular shape is especially evident where the chain has no engagement with the arm carrying sprockets.

Bell et al U.S. Pat. No. 2,827,797 describes the changing of a driving sprocket shape for a bicycle from elliptical to round. This is ostensibly to accomplish an easier pedalling for portions of the circumference of the driving sprocket when it is in an elliptical shape. However, it would seem that in other portions of the elliptically shaped sprocket it would require added resistance to pedalling.

Hunt U.S. Pat. No. 3,798,989 employs manually shiftable sprocket sections to effect driving ratio changes in a bicycle drive.

Clark U.S. Pat. No. 3,800,613 shows a manually adjustable sprocket by means of a plurality of hinged arms, each of which carries a sprocket at its outer end. The adjustment is effected by the use of inclined ramps to move the sprockets inwardly or outwardly to change the driving ratio.

Hagen U.S. Pat. No. 3,850,045 employs a plurality of radially adjustable sprockets. Curvilinear paths are provided between two plates and it is in these paths that each sprocket is journaled. When one or the other of the plates is braked the sprockets move inwardly or outwardly in the spiral like paths to accomplish a change in the driving ratio.

Bravin U.S. Pat. No. 3,861,232 shows a construction in which toothed segments of a sprocket may be adjustably positioned on a disc blank so that sprockets of various diameters may be made.

Hunt U.S. Pat. No. 3,861,227 shows a manually adjustable, variable diameter bicycle transmission sprocket.

Gregory et al U.S. Pat. No. 3,867,851 is a variable diameter sprocket which has toothed segments which are movable in a spiral path somewhat similar to the previously discussed Hagen U.S. Pat. No. 3,850,045. Again, the diameter of this patented device is changed by braking the segment holding disc causing the segments to move up or down the spiral track.

SUMMARY OF THE INVENTION

A principal object of the present invention is to provide a novel automatic transmission for chain driven vehicles, such as a bicycle, in which the external resistance to turning of the driving sprocket causes the sprocket to change its diameter to thus automatically change the driving ratio in response to such external resistance.

An important object of this invention is to provide a novel driving sprocket for chain driven cycles which comprises a plurality of small sprockets carried on pivoting arms all of which arms are linked together and spring biased in a certain direction whereby the small sprockets are disposed at uniform radial dispositions dependent directly on the external resistance to turning said driving sprocket.

Another important object of this invention is to provide a novel automatic transmission for bicycles in which the driver need do nothing but pedal and the proper driving ratios will be automatically obtained depending on the resistance to the pedalling operation.

Other and further important objects and advantages will become apparent from the disclosures in the following specification and accompanying drawings.

IN THE DRAWINGS

FIG. 3 is a view taken through the central portion of the bicycle frame showing the foot pedal arms and the driving sprocket in full section.

FIG. 4 is a detail view of the driving sprocket as viewed from the line 4—4 of FIG. 3 and particularly showing the adjustable detent engagement of the sprocket tensioning springs.

AS SHOWN IN THE DRAWINGS

Figure 1:
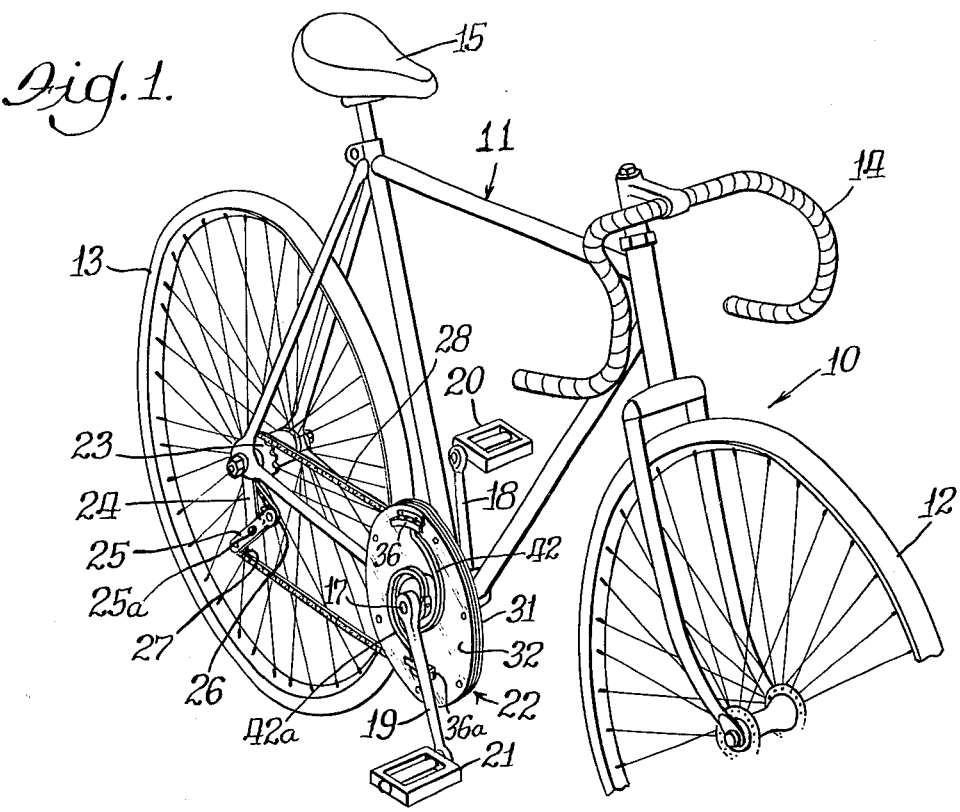
FIG. 1 is a perspective view of a bicycle with the automatic transmission of this invention mounted thereon.
Figure 2:
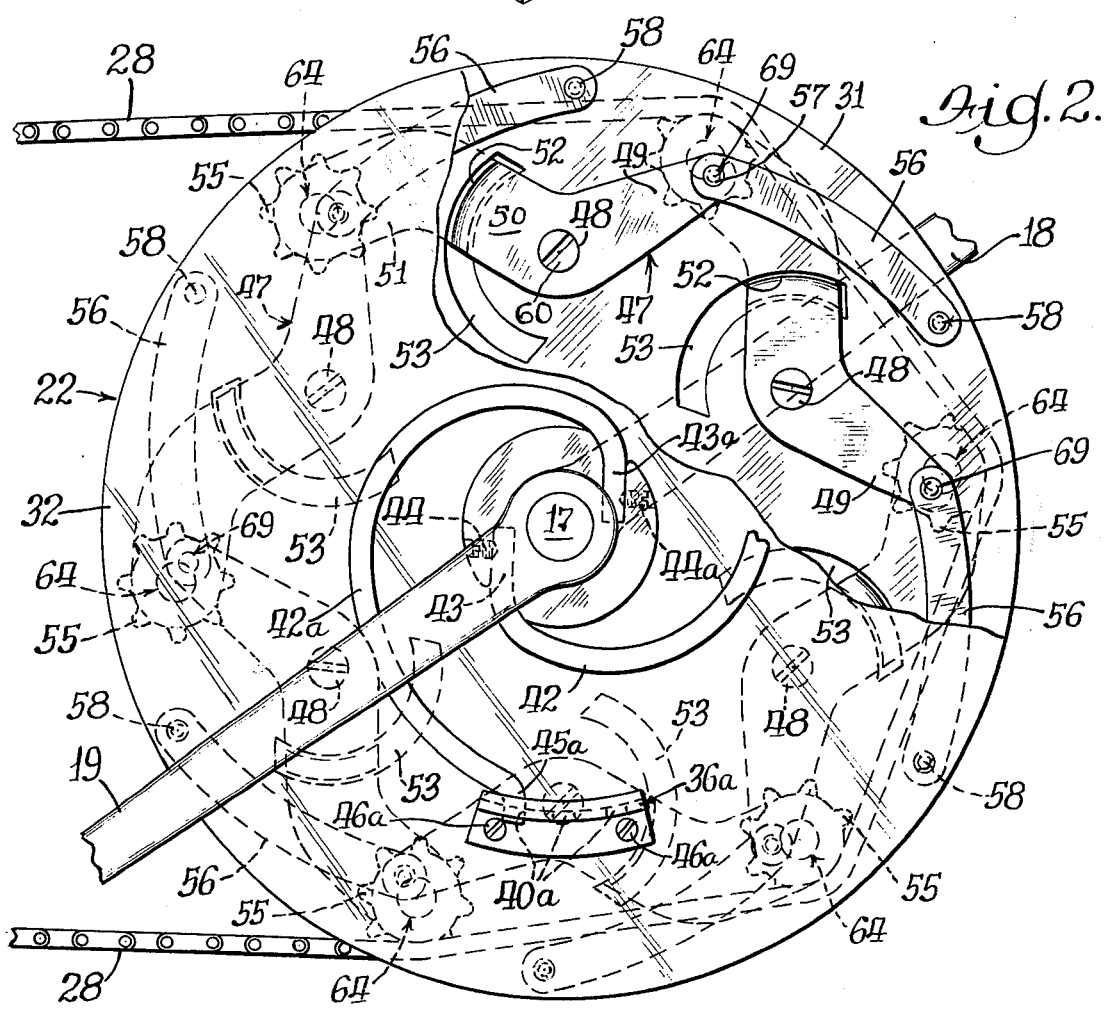
FIG. 2 is a front elevational view of the outside of the driving sprocket of this invention with parts thereof broken away to more effectively show the interior construction.

The reference numeral 10 indicates generally a bicycle having a customary tubular frame 11, a front wheel 12, a foot pedal driven rear wheel 13, steerable handle bars 14, and a rider's seat 15. The bicycle further includes a central hub 16 formed on the center of the bottom of the frame 11. This hub journally houses a shaft 17 which carries the foot operated pedals and the bicycle driving sprocket. As best shown in FIGS. 1 and 3 a pedal arm 18 is pinned at 18a to one outer end of the shaft 17. Another pedal arm 19 is pinned at 19a to the other outer end of the shaft 17. As is customary the pedal arms extend radially outwardly from the shaft in opposite directions and each arm is provided with a foot engaging pedal, 20 for the arm 18, and 21 for the arm 19.

The foot driven sprocket which for convenience will be termed the bicycle driving sprocket is generally designated by the numeral 22 and primarily embodies the principles of this invention. The bicycle also includes a small sprocket 23 adjacent the rear wheel 13 which is in planar alignment with the driving sprocket 22. An arm 24 is affixed to and depends from the frame 11 at a position adjacent the small sprocket 23 associated with the rear wheel. A spring biased arm 25 is pivotally mounted at 25a on the lower end of the depending arm 24. The arm 25 tends to be rotated by the spring means in a clockwise direction as viewed in FIG. 1. A first idler sprocket 26 is journally mounted on one end of the spring biased arm 25 and a second idler sprocket 27 is journally mounted on the other end of the spring biased arm 25. A bicycle chain 28 extends around the driving sprocket 22, the rear wheel sprocket 23 and the idler sprockets 26 and 27 in the manner shown in FIG. 1. Of course the idler sprockets 26 and 27 are in the same plane as the driving sprocket and the rear wheel sprocket. As the arm 25 is spring biased, the chain 28 is constantly properly tensioned regardless of the changes that may be made in the effective diameter of the driving sprocket 22.

The driving sprocket 22 comprises a number of components including a hub 29 which is carried on the shaft 17. The hub and shaft are joined together by an axially disposed key 30. An inner disc 31 of the sprocket 22 is welded or otherwise fastened to the inner end of the hub 29. The sprocket 22 also includes an outer disc 32 which is spaced outwardly from the disc 31. The outer disc is provided with a generally C shaped annular internal ring 33 which is journally supported on the hub 29. The C shaped ring includes a generally vertical side 34 which slidingly abuts the outer surface of the inner disc 31. A generally horizontal portion 35 of the C is the part that journally rides on the outer circumference of the hub 29.

Diametrically spaced apart arcuate members 36 and 36a are provided on the outside of the outer disc 32. These arcuate members include radially disposed outwardly extending flanges 37 and 37a which abuttingly engage the outer surface of the outer disc 32. The arcuate members 36 and 36a also include axially disposed flanges 38 and 38a respectively and thence radially inwardly extending flanges 39 and 39a. It is these flanges 38 and 38a and 39 and 39a which form a housing or enclosure for the springs which are used to provide a spring biasing for relative rotation between the inner and outer discs 31 and 32. The flanges 38 and 38a are each provided with a series of spaced apart notches 40 and 40a respectively to facilitate the adjustment of the tensioning of the springs to be described. The sprocket hub 29 is provided with diametrically disposed notches 41 and 41a opening to the outer periphery of the hub 29.

Curved leaf springs 42 and 42a each have their inner end portions 43 and 43a respectively engaging the notches 41 and 41a in the hub 29. Set screws 44 and 44a are provided in the hub 29 to securely lock the spring ends 43 and 43a within the hub notches. Outwardly bent end extensions 45 and 45a of the leaf springs 42 and 42a are provided for manually removable engagement with any one of the series of notches 40 and 40a respectively in the arcuate members 36 and 36a. The arcuately shaped spring housing members are fastened to the outer disc by means of screws or rivets 46 and 46a respectively. There is thus provided adjustable spring tensioning means for relative rotation between the two discs 31 and 32 whereby the bicycle user may adjust the strength of the spring biasing between the two discs.

The driving sprocket 22 further includes a plurality of double bellcrank shaped identical rocker arms 47. These arms 47 are pivotally mounted at 48 to the disc or plate 31. The arms 47 each have an end portion 49, an angularly disposed portion or section 50, and an oppositely angled other end portion 51. The pivotal mounting 48 is located substantially at the juncture of the angled portions 49 and 50. The arms 47 are also provided with a planar offset 52 in the section 50 located close to the juncture of that section with the other end section 51.

The disc or plate 31 is equipped with spaced apart arcuate slots 53. These slots are disposed at regular intervals around the surface of the disc 31 to permit passage of the arms 47 therethrough. The arms 47 lie generally flat by reason of the planar offset 52 which is disposed at the location of the arcuate slots 53.

The discs 31 and 32 define a space 54 therebetween to house the sections 49 and 50 of the arms 47. The arms 47 pass through the arcuate slots 53 in the inner disc 31 and by means of the offset 52, as previously stated the arms remain generally extending in the same longitudinal direction. The arms 47 are permitted limited swinging movement about their pivots 48 within the extent of the arcuate slots 53. The center of the arcs defining the slots 53 are the pivots 48. The end portions 51 of the arms 47 are exposed on the inside of the disc 31 adjacent the bicycle frame 11.

A relatively small sprocket 55 is mounted by means 55a on the outer end of each arm portion 51. The mounting means 55a constitutes a one-way clutch such that all of the sprockets may rotate freely in one similar forward direction but are restrained from rotation in the opposite or rearward direction. No attempt has been made to show the details of these one-way clutches as they are old in the art and are readily available on the market. It is these small sprockets, all lying in the same plane, that in combination comprise the chain engaging portion of the driving sprocket 22. As the arms 47 are swung about their pivots 48 the effective diameter of the driving sprocket is changed. The arcuate slots 53 act as stops for the minimum and maximum positions of the arms 47.

A plurality of links 56, which are generally elongated, are slightly curved to accommodate their close fitting embodiment in the device of this invention. Each link 56 has one end pivotally attached at 57 to the outer end of the portion 49 of the arm 47. The other ends of the links 56 are pivotally mounted at 58 on the inner side of the outer disc or plate 32. The links 56 are also located in the space 54 lying between the discs 31 and 32. Thus, most of the moving parts and operating mechanisms of the varying diameter driving sprocket 22 are hidden between the plates 31 and 32. On the outside all that one sees is the spring adjusting mechanisms to permit the rider to adjust the resistance to relative rotation of the discs 31 and 32 merely by positioning the ends 45 and 45a in any one of their respective series of notches 40 and 40a. As the springs are moved to the different notches 40 and 40a different tensions are obtained in these spring elements 42 and 42a. This will enable persons of varying sizes and strengths to use the same bicycle and still have an easy response to the automatic changing of driving ratios between the driving sprocket 22 and the rear wheel driven sprocket 23. It should be pointed out that when there is relative rotation of the discs the rocker arms 47 move about their pivots 48.

One principle of this automatic transmission for bicycles that is very important to its successful operation is the simultaneous and uniform movement of the rocker arms 47. When external resistance to manual pedalling is encountered one or more of the small sprockets 55 tends to move inwardly in a generally radial direction. Without the interconnection of the arms with each other by reason of the links 56 and the outer disc to which the links are all attached, each small sprocket 55 might move inwardly or outwardly different amounts. However, in the present construction all of the small sprockets 55 are disposed at an identical distance from the central hub so that at all times the combination of small sprockets define a general circle and not some irregular pattern which would make the bicycle difficult if not impossible to ride.

Figure 5:
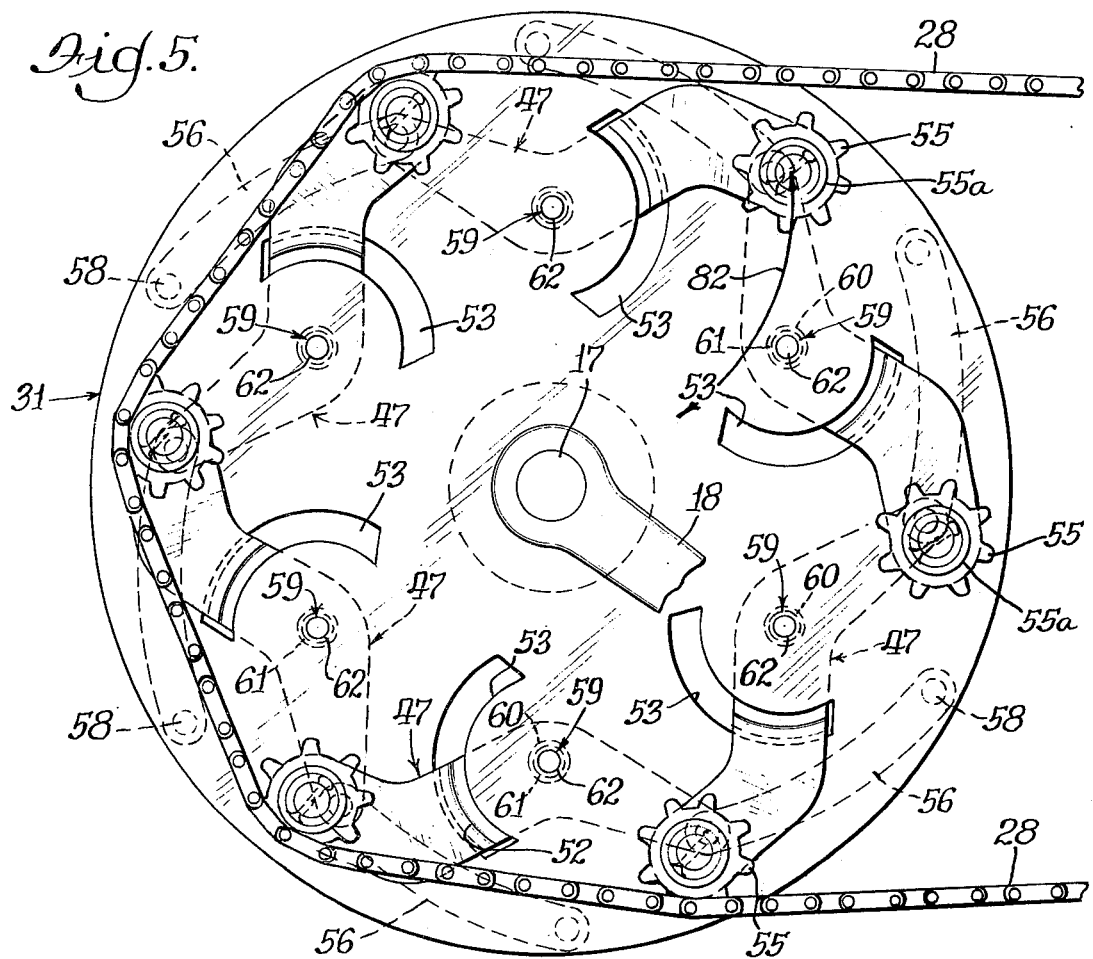
FIG. 5 is a front elevational view of the inside face of the driving sprocket of this invention and opposite the side as shown in FIG. 2 and with the sprocket shown in its maximum diameter.
Figure 6:
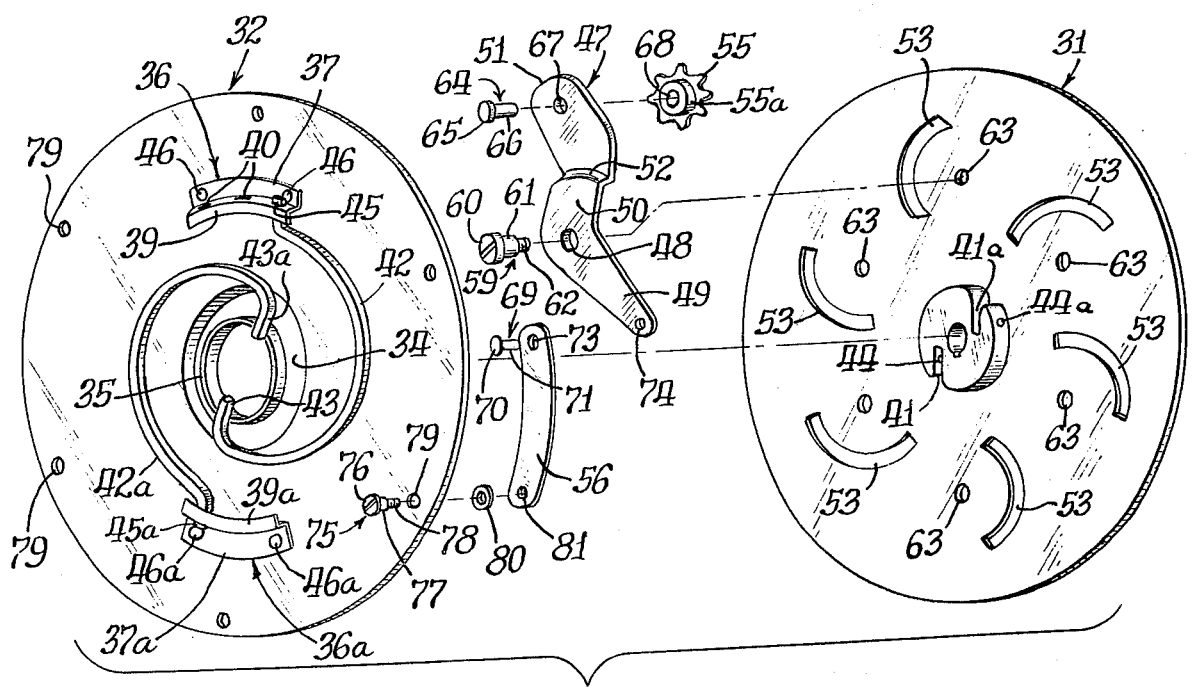
FIG. 6 is an exploded perspective view of the driving sprocket of this invention.

The exploded view of FIG. 6 best shows the construction of the driving sprockets and the details of the component elements of this unique device. The inner disc 31 with its integral hub 29 is adapted to receive entry of the offset end portions 51 of the rocker arms 47 through the arcuate slots 53. Bolts 59 comprising a head 60, a cylindrical shoulder 61 and a threaded shank 62 are adapted to be inserted through the pivot hole 48 of the double bellcrank shaped rocker arms 47. The smooth cylindrical shoulder 61 forms the bearing surface for the pivoting of the arm 47 thereabout. The threaded shank 62 of the bolt 59 engages and is securely held in a threaded hole 63 in the plate 31. The head 60 is larger in diameter than the opening 48 in the arm 47 and thus acts as a lock for the arm after assembly as just described. A pin 64 having a head 65 and a shank 66 is inserted through a hole 67 in the end portion 51 of the arm 47 and thence through a hole 68 in the small sprocket 55. Means are provided between the shank 66 and the hole 67 to hold the pin 64 fixed relative to the arm 47. A cotter pin 68a or the like holds the small sprocket 55 onto the shaft 66 as shown in FIG. 5. This assembly holds the sprocket to the arm 47 and with the one-way clutch 55a interposed between the sprocket and the shank or shaft 66 the sprocket 55 may rotate only in one direction. A rivet 69 having a head 70, a cylindrical shank 71 and a spaced apart opposing head 72 is adapted to join the link 56 and the arm 47. The rivet 69 with only the inner head 70 formed thereon is inserted through a hole 73 in one end of the link 56 and thence through a hole 74 in the end of the portion 49 of the arm 47. At this point the outer head 72 is formed on the shank 71. The rivet 69 is made such that it permits the free pivoting of the rocker arm 47 relative to the link arm 56. As previously described, the pivotal connection is identified by the numeral 57. A bolt or rivet 75 having a head 76, a cylindrical shoulder 77, and a threaded shank 78 is inserted through a hole 79 in the outer disc 32, thence through a washer 80 at which point the threaded shank 78 engages a threaded hole 81 in the other end of the link 56. The cylindrical shoulder 77 forms the bearing surface for the hinge or pivot mounting of the link 56 relative to the disc 32. The pivot assembly has previously been described and identified as 58. The assembly of the driving sprocket 22 is now complete. It should be understood that the threaded bolts could be rivets if it is so desired. The adjustable springs 42 and 42a are accesible from the outside of the disc 32 as previously described.

Figure 7:
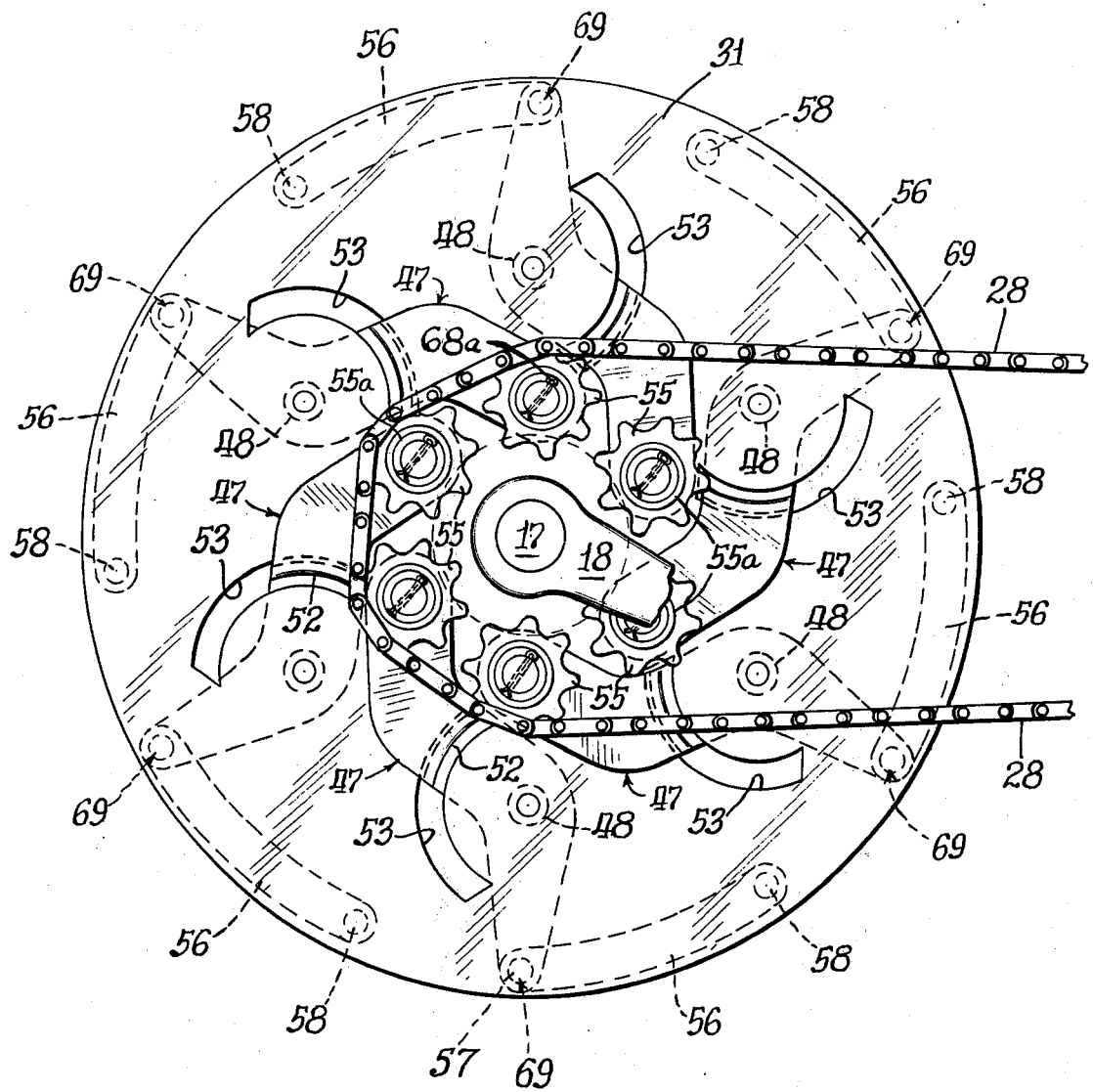
FIG. 7 is a view similar to FIG. 5 but with the driving sprocket shown in its minimum diameter.

In FIG. 5 the chain 28 is shown in engagement with the plurality of small sprockets 55 when the rocker arms 47 have their ends 51 in their outermost or extended positions. When the arms 47 are swung inwardly about their hinge mountings 48 the innermost position of the small sprockets 55 is shown in FIG. 7. Thus the effective diameter of the driving sprocket 22 is changeable from a very large diameter as shown in FIG. 5 to the very small diameter as shown in FIG. 7. It should also be apparent that any intermediately sized diameter may be obtained in an infinite number of positions between the extreme positions. The range of movement of the small sprockets 55 is shown by the arrow 82 in FIG. 5. As previously explained when one arm 47 is rocked they are all rocked in unison to the same degree by reason of the connecting links 56.

THE OPERATION OF THE DEVICE

The operation of the bicycle 10 of this invention is simple in that it is identical to any bicycle without gear changes. The user has nothing to do but pedal with his feet and the driving sprocket will drive the rear wheel sprocket by the chain 28. The small sprockets 55 are locked against rearward rotation so that the whole device 22 is rotated. However, if the rider back pedals the chain 28 will not be driven as the small sprockets 55 will merely rotate freely in that forward direction while the driving sprocket 22 rotates in a rearward direction. There are no other mechanisms to set or change once riding has commenced. The springs 42 and 42a should have been previously adjusted to accommodate the size and strength of the driver. After such spring adjustments have been made the rider does nothing more than pedal and the bicycle will be propelled forwardly with the most desirable ratio automatically obtained between the driving sprocket and the rear wheel sprocket 23. Normally the springs 42 and 42a keep the plurality of small sprockets 55 spread outwardly. However, once the driver is on the bicycle and starts to turn the pedals, the external resistance to starting the forward movement of the bicycle will cause the rocker arms 47 to swing radially inwardly making for a small diameter driving sprocket as shown in the position of the small sprockets in FIG. 7. This gives the operator the greatest mechanical advantage for propelling the bicycle. After the initial inertia of starting is overcome and the bicycle is on level terrain the external resistance is reduced and the small sprockets automatically swing outwardly and continue that gradual movement outwardly until the small sprockets are in their large diameter position as shown in FIG. 5. Now, the bicyclist has lesser mechanical advantage but greater speed with less revolutions of the pedals. This situation continues until some up grade is encountered and the external resistance to turning of the pedals is increased thereupon automatically causing the diameter of the driving sprocket to be reduced to a position for easy operation of the bicycle by the rider. There is thus provided an automatic transmission for bicycles or any other pedal driven vehicle or device. The springs 42 and 42a are merely to normally keep the discs 31 and 32 at their maximum relative rotated position. Hence, if a child or small person were riding the bicycle the springs 42 and 42a would be adjusted for a lesser tension so the response to external resistance would be easier to attain. Conversely, when a heavy or large person of great strength is using the bicycle the springs 42 and 42a should be adjusted to their maximum tension. Of course, all of the small sprockets 55 move inwardly or outwardly simultaneously by reason of their interconnection with the links 56 and there is always a generally round or circular arrangement of the small sprockets. However, because of the spacing between the small sprockets the overall driving sprocket is not a fully toothed circular sprocket. There is and will always be flat stretches of chain between the spaced sprockets 55. These flat portions do not adversely affect the operation of the bicycle and the driving sprocket 22 acts as though it were in fact fully filled in all around its circumference. When the diameter of the driving sprocket 22 changes, there is a concurrent necessity to change the effective length of the chain 28 and this is accomplished by the spring biased idler sprockets 26 and 27 which keep the chain uniformly taut at all times.

I am aware that numerous details of construction may be made throughout a wide range without departing from the principles disclosed herein and I therefore do not propose limiting the patent granted hereon otherwise than as necessitated by the appended claims.

What is claimed is:

1. A chain carrying sprocket of automatically varying diameter comprising a supporting plate, a plurality of relatively short identical arms pivotally mounted on said supporting plate, the pivot mountings of said arms defining a circle on said supporting plate, a small sprocket carried on each of said arms, a one-way clutch interposed between each of said small sprockets and said identical arms to permit rotation of said small sprockets in only one direction, a link member pivotally mounted at a position spaced from said small sprocket on each of said arms, means joining said link members, and spring means joining said supporting plate to said means joining said link members and arranged and constructed so that resistance to turning said supporting plate causes said small sprockets to uniformly swing radially inwardly on their identical arms.

2. A device as set forth in claim 1 in which the identical arms are pivotally mounted on said supporting plate intermediate their ends, each of said small sprockets is carried on one end of each of said arms, each link member is pivotally mounted on the other end of each of said arms, and the other ends of said link members are pivotally joined to the means joining said link members.

3. A device as set forth in claim 1 in which the spring means joining said supporting plate to said means joining said link members is adjustable.

4. A device as set forth in claim 1 in which said means joining said link members comprises a second plate journally mounted relative to said supporting plate and disposed generally parallel thereto, and the joining of said link members constituting pivotal mountings and arranged in a circular path around the second plate.

5. A chain carrying sprocket of automatically varying diameter comprising a supporting plate, a plurality of relatively short identical arms pivotally mounted on said supporting plate intermediate their ends, the pivot mountings of said arms defining a circle on said supporting plate, a small sprocket carried on one end of each of said arms, means permitting rotation of said sprockets in one direction only, a link member pivotally mounted on the other end of each of said arms, a second plate journally mounted relative to said supporting plate the other ends of said link members pivotally mounted on said second plate, spring means disposed intermediate said supporting plate and said second plate and arranged to resist relative rotation of said plates, whereby the degree of external resistance to the turning of said supporting plate causes said small sprockets to define a greater or lesser diameter chain carrying sprocket.

6. A chain carrying sprocket of automatically varying diameter comprising a supporting plate, a plurality of relatively short identical arms pivotally mounted on said supporting plate, the pivot mountings of said arms defining a circle on said supporting plate, tooth means carried on each of said arms at a position spaced from said pivot mounting, a link member pivotally mounted on each of said arms at a position spaced from said tooth means and said pivot mounting, means joining said link members, and spring means joining said supporting plate to said means joining said link members and arranged and constructed so that resistance to turning said supporting plate causes said tooth means to uniformly swing radially inwardly on their identical arms.

7. A sprocket-like unit for chain driven mechanisms comprising a sprocket, said sprocket unit including a plate, means journally mounting said plate for rotation, pedal means arranged and constructed to rotate said sprocket unit, a plurality of individual identical arms pivotally mounted intermediate their ends on said plate in a circular ring about said plate, a small sprocket journally mounted on the same end of each of said identical arms, means permitting said sprockets to rotate in only one direction, a plurality of link members, each one of said link members having its one end pivotally joining each one of said identical arms at its end opposite the end carrying the small sprocket, a second plate member journally mounted over the means journally mounting said first plate, means pivotally mounting the other ends of said link members in a uniform circular path on said second plate, and spring means interposed between the first and second plates in a manner to uniformly urge the radial outward swinging of said identical arms about their pivots with the small sprockets at their outer ends, and said sprocket unit defining a single large sprocket consisting of the plurality of small sprockets and having an infinitely variable diameter depending on the resistance to pedalling.

8. An Automatic transmission for bicycles comprising a supporting frame, front and rear wheels journally mounted on said supporting frame, a shaft journally mounted transversely in said frame at a position between the front and rear wheels, foot driven pedals mounted on opposite ends of said shaft, a first disc having a central hub portion affixed to said shaft, said first disc located adjacent said hub and inwardly of said pedal on that end of said shaft, a second disc having an enlarged hub portion journally mounted over the central hub of said first disc, spring means joining said first disc to said second disc in such a manner as to provide for limited yieldable relative rotation between said first and second discs, a plurality of identical arms pivotally mounted on said first disc at uniformly spaced apart positions in a circular path around said first disc, a relatively small sprocket mounted on one end of each arm, the pivotal mounting of said arms on said first disc being intermediate the ends of said arms, means interposed between said small sprockets and said arms to permit rotation of said small sprockets on said arms in one direction only, a plurality of links, one end of each of said links pivotally mounted on said second disc, the other end of each of said links pivotally mounted on the other end of each of said identical arms, a sprocket affixed to said rear wheel, an arm pivotally mounted on said frame adjacent the rear wheel, an idler sprocket journally mounted on the free end of said arm, spring means normally urging the free end of said arm rearwardly, said idler sprocket disposed in the same plane as the sprocket on the rear wheel and the plurality of small sprockets, a chain draped around the plurality of said small sprockets, said sprocket on the rear wheel of said bicycle, and said idler sprocket, said idler sprocket acting to keep said chain taut at all times, whereby when resistance to pedalling is reduced the plurality of pivoting arms are swung outwardly and the plurality of small sprockets in combination define a relatively large sprocket whereas when the resistance to pedalling increases the plurality of pivoting arms tend to swing radially inwardly against the action of the spring means to thereby have their small sprockets define in combination a gradually decreasing diameter sprocket to thus provide a bicycle which automatically and infinitely varies the diameter of the driving sprocket dependent on the resistance to pedalling.

9. An Automatic transmission for bicycles comprising a supporting frame, front and rear wheels journally mounted on said supporting frame, a tubular hub formed on substantially the fore and aft center of the frame between said front and rear wheels, a shaft journally mounted transversely in said tubular hub, foot driven pedals mounted on opposite ends of said shaft, a first disc having a central hub portion affixed to said shaft, said first disc located adjacent said hub and inwardly of said pedal on that end of said shaft, a second disc having an enlarged hub portion journally mounted over the central hub of said first disc and defining a uniform annular space between said first and second discs, spring means joining said central hub portion of said first disc to said second disc to provide for limited yieldable relative rotation between said first and second discs, a plurality of identical arms pivotally mounted on said first disc at uniformly spaced apart positions around said first disc, a relatively small sprocket mounted on one end of each arm on the side of said first disc adjacent the tubular hub of the frame, said mounting including means to permit rotation of said sprocket in one direction only, each of said arms having an offset therein, said first disc having a plurality of arcuate slots therein, the offset portion of each arm passing through one of said arcuate slots to provide for the arcuate swinging of said arms, said arms having inward extensions within said annular space between said first and second discs, the pivotal mounting of said arms on said first disc being intermediate the ends of said extensions, a plurality of links, one end of each of said links pivotally mounted on the inside of said second disc, the other end of each of said links pivotally mounted on the inner end of each of said arms, a sprocket affixed to said rear wheel, a chain draped around the plurality of said small sprockets and said sprocket on the rear wheel of said bicycle, whereby when resistance to pedalling is reduced the plurality of pivoting arms are swung outwardly and the plurality of small sprockets in combination define a relatively large sprocket whereas when the resistance to pedalling increases the plurality of pivoting arms tend to swing radially inwardly against the action of the spring means to thereby have their small sprockets define in combination a gradually decreasing diameter sprocket to thus provide a bicycle which automatically and infinitely varies the diameter of the driving sprocket dependent on the resistance to pedalling, and means to keep said chain taut regardless of the diameter of the driving sprocket.

10. A device as set forth in claim 9 in which said identical arms are bell-crank shaped to condense the multi-diametered driving sprocket into a relatively small space.

11. A device as set forth in claim 9 in which said spring means includes means for adjusting the tension thereof whereby the tension may be adjusted to accommodate any size rider of said bicycle.

12. An automatic transmission for a foot pedal operated vehicle comprising a supporting frame, ground engaging wheels journally mounted on said frame, a shaft journally mounted transversely in said frame at a fore and aft position between said ground engaging wheels, foot driven pedals mounted on opposite ends of said shaft, a first disc affixed to said shaft, said first disc located adjacent said frame and inwardly of said pedal on that end of said shaft, a second disc journally mounted on said first disc, spring means interposed between said first disc and said second disc to permit limited yieldable relative rotation between said first and second discs, a plurality of identical arms pivotally mounted on said first disc at uniformly spaced apart positions in a circular path around said first disc, a relatively small sprocket mounted on one end of each arm with a one way clutch therebetween to permit rotation of said small sprockets in only one direction, the pivotal mountings of said arms located intermediate the ends of said identical arms, a plurality of links, one end of each of said links pivotally mounted on said second disc, the other end of each of said links pivotally mounted on the end of each of said arms opposite the sprocket carrying end, a sprocket associated with one of said ground engaging wheels of the vehicle and located in the same plane as the plurality of small sprockets, and said sprocket associated with said ground engaging wheel, whereby drive is imparted from said pedal driven small sprockets to said sprocket associated with the ground engaging wheel, whereby when resistance to pedalling is reduced the small sprockets mounted on the pivoting arms in combination define a relatively large diameter driving sprocket whereas when the resistance to pedalling increases the arms tend to swing radially inwardly against the action of the spring means between the first and second discs to thereby have their small sprockets define in combination a gradually decreasing diameter driving sprocket to thus provide a vehicle which automatically infinitely varies the diameter of the driving sprocket consisting of the plurality of small sprockets, dependent on the resistance to pedalling, and means associated with said chain to keep said chain taut regardless of the size of the driving sprocket.

13. An automatic transmission for a foot pedal operated vehicle comprising a supporting frame, ground engaging wheels journally mounted on said frame, a shaft journally mounted transversely in said frame, foot driven pedals mounted on opposite ends of said shaft, a first disc having a central hub portion affixed to said shaft, said first disc located adjacent said frame and inwardly of said pedal on that end of said shaft, a second disc having an enlarged hub portion journally mounted over the central hub of said first disc and defining a uniform annular space between said first and second discs, spring means joining said first disc to said second disc to permit limited yieldable relative rotation between said first and second discs, a plurality of identical arms pivotally mounted on said first disc at uniformly spaced apart positions in a circular path around said first disc, a relatively small sprocket mounted on one end of each arm on the side of said first disc adjacent the frame, means interposed between said small sprocket and said arm to permit rotation of said small sprocket on said arm in one direction only, said first disc having a plurality of arcuate slots therein, each of said arms having an offset therein for passing through one of said arcuate slots, said arms having extensions within said annular space between said first and second discs, the pivotal mountings of said arms located intermediate the ends of said extensions, a plurality of links, one end of each of said links pivotally mounted on the inside of said second disc, the other end of each of said links pivotally mounted on the inner end of each extension of each of said identical arms, a sprocket associated with one of said ground engaging wheels of the vehicle and located in the same plane as the plurality of several sprockets, an idler sprocket located in the same plane as the sprocket associated with said ground engaging wheel, means for spring biasing said idler sprocket on said frame near the sprocket associated with the ground engaging wheel, a chain draped around the plurality of said small sprockets, said sprocket associated with one of said ground engaging wheels, and said idler sprocket, and said chain arranged and constructed to impart drive from said pedal driven disc to said sprocket associated with said ground engaging wheel, and said spring biased idler sprocket maintaining the chain taut, whereby when resistance to pedalling is reduced the small sprockets mounted on the pivoting arms in combination define a relatively large sprocket whereas when the resistance to pedalling increases the arms tend to swing radially inwardly against the action of the spring means between the first and second discs to thereby have their small sprockets define in combination a gradually decreasing sprocket to thus provide a vehicle which automatically infinitely varies the diameter of the driving sprocket consisting of the plurality of small sprockets, dependent on the resistance to pedalling.

14. A device as set forth in claim 13 in which said identical arms are bell-crank shaped to condense the multi-diametered driving sprocket into a relatively small space.

15. A device as set forth in claim 13 in which said spring means includes means for adjusting the tension thereof whereby the tension may be adjusted to accommodate any size of rider of said vehicle.

* * * * *